United States Patent
Gebhart et al.

(10) Patent No.: US 9,378,066 B2
(45) Date of Patent: Jun. 28, 2016

(54) DYNAMIC RESIZING OF APPLICATIONS RUNNING ON VIRTUAL MACHINES

(75) Inventors: Alexander Gebhart, Akazienweg (DE); Erol Bozak, Vinzentiusstrasse (DE)

(73) Assignee: SAP SE, Walldorf (DE)

( * ) Notice: Subject to any disclaimer, the term of this patent is extended or adjusted under 35 U.S.C. 154(b) by 1707 days.

(21) Appl. No.: 12/037,055

(22) Filed: Feb. 25, 2008

(65) Prior Publication Data

US 2009/0217267 A1 Aug. 27, 2009

(51) Int. Cl.
*G06F 9/455* (2006.01)
*G06F 9/50* (2006.01)
*G06F 11/34* (2006.01)

(52) U.S. Cl.
CPC ............ *G06F 9/5077* (2013.01); *G06F 9/5027* (2013.01); *G06F 11/3409* (2013.01); *G06F 2201/815* (2013.01); *G06F 2201/86* (2013.01); *G06F 2201/885* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 7,299,468 B2* | 11/2007 | Casey et al. | 718/104 |
| 7,356,770 B1* | 4/2008 | Jackson | 715/736 |
| 7,552,420 B1* | 6/2009 | Smith et al. | 717/121 |
| 7,587,467 B2* | 9/2009 | Hesselink | H04L 67/06 709/214 |
| 2004/0111725 A1* | 6/2004 | Srinivasan et al. | 718/105 |
| 2005/0034129 A1* | 2/2005 | Chew | 718/100 |
| 2005/0055696 A1* | 3/2005 | Betzler | G06F 9/5088 718/100 |
| 2005/0086659 A1* | 4/2005 | Huras et al. | 718/104 |
| 2005/0108714 A1* | 5/2005 | Geye et al. | 718/100 |

OTHER PUBLICATIONS

Paul M. Ruth, "Adaptive virtual distributed environments for shared cyberinfrastructures", A Dissertation Submitted to the Faculty of Purdue University, Aug. 2007, pp. 1-126.
Jyotishman Pathak, et al., "A Framework for Dynamic Resource Management on the Grid", HP Labs Technical Report, HPL-2005-153, (2005), pp. 2-12.
Yuting Zhang, et al., "Friendly Virtual Machine: Leveraging a Feedback-Control Model for Application Adaptation", Proceedings of the 1st ACM/USENIX international conference on Virtual execution environments, (2005), pp. 1-10.
Chang, et al., "Automatic Configuration and Run-time Adaptation of Distributed Applications", Proceedings on the Ninth International Symposium on High-Performance Distributed Computing, (2000), pp. 1-19.
Chang, et al., "A Framework for Automatic Adaptation of Tunable Distributed Applications", Cluster Computing, vol. 4, Issue 1 (Mar. 2001), pp. 49-62.

* cited by examiner

*Primary Examiner* — Gregory A Kessler
(74) *Attorney, Agent, or Firm* — Mintz Levin Cohn Ferris Glovsky and Popeo, P.C.

(57) ABSTRACT

Methods and apparatus, including computer program products, are provided for sizing an application running on a virtual machine. In one aspect, there is provided a computer-implemented method. The method may include registering, at a monitor, one or more controllers associated with one or more corresponding applications. Configuration information may be received for one or more corresponding applications. Event information may be provided to the one or more controllers to enable the one or more controllers to adjust one or more aspects of the corresponding applications. The event information may represent changes in resources (e.g., at the physical machine hosting the virtual machine and application). The aspects may be adjusted based on the changes. Related apparatus, systems, methods, and articles are also described.

24 Claims, 5 Drawing Sheets

DYNAMIC RESIZING OF APPLICATIONS RUNNING ON VIRTUAL MACHINES

FIELD

The present disclosure generally relates to optimizing systems implementing virtualization technology.

BACKGROUND

Virtualization technology provides a mechanism for optimizing processing. Virtualization technology provides a software layer that when executed allows multiple virtual machines with, in some cases, different operating systems to run side-by-side with other virtual machines running on the same physical machine (e.g., a node, computer, processor, server, and the like). The virtualization software provides a so-called "container" that wraps and isolates the virtual machine from other virtual machines. For example, in a server complex including fifty physical servers, each of which hosts its own application server, virtualization permits the server complex to instead operate with, for example, twenty-five physical servers, each of which includes virtualization software providing two virtual machines for the application servers. In both cases, fifty application servers are deployed, but with virtualization, the number of physical servers is reduced to twenty-five.

Virtualization software may also provide one or more of the following functions; running multiple virtual machines with different operating systems at the same time on the same physical machine; generating fully configured isolated virtual machines with a set of virtual hardware including an operating system and applications; saving, copying, and provisioning of virtual machines; and moving virtual machines from one physical machine to another physical machine for workload management.

When a virtual machine is used, the virtual machine may include an operating system and one or more applications. An operating system (OS) is the program that, after being initially loaded into a computer by a boot program, manages other programs on the computer. The other programs (also referred to as application programs or programs) may use the operating system by making requests for services through one or more application program interfaces (APIs) of the operating system. An application may perform one or more specific functions (or tasks) directly for a user or, in some cases, another program or application program. Examples of applications include spreadsheets, word processing, browsers, databases, and the like. For example, a virtual machine may include an operating system, such as Linux or Windows Vista, and one or more application programs, such as a browser, all of which operate in the so-called "container" provided by the virtual machine.

In some cases, the virtual machine may also include some data for use by the application. When this is the case, the virtual machine may be referred to as a virtual appliance. The phrase "virtual appliance" refers to an example of a virtual machine that may include the application, operating system, and other items (e.g., data, drivers, etc) to enable simplification of the installation and the configuration process associated with running the application. An example of a virtual appliance is the MediaWiki software that powers Wikipedia, which is available as a virtual appliance. The MediaWiki appliance contains all the necessary software, including operating system, database, and MediaWiki, to run a wiki installation as a so-called "black box."

SUMMARY

The subject matter disclosed herein provides methods and apparatus, including computer program products, for sizing an application, such as an application running in a virtual machine.

Methods and apparatus, including computer program products, are provided for sizing an application running on a virtual machine. In one aspect, there is provided a computer-implemented method. The method may include registering, at a monitor, one or more controllers associated with one or more corresponding applications. Configuration information may be received for the one or more corresponding applications. Event information may be provided to the one or more controllers to enable the one or more controllers to adjust one or more aspects of the corresponding applications. The event information may represent one or more changes in resources (e.g., at the physical machine hosting the virtual machine and application). The one or more aspects adjusted based on the one or more changes.

The subject matter described herein may be implemented to realize the advantage of facilitating sizing of an application to enable the application to adapt to changes in the physical resources at a physical machine including the virtual machine hosting the application.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
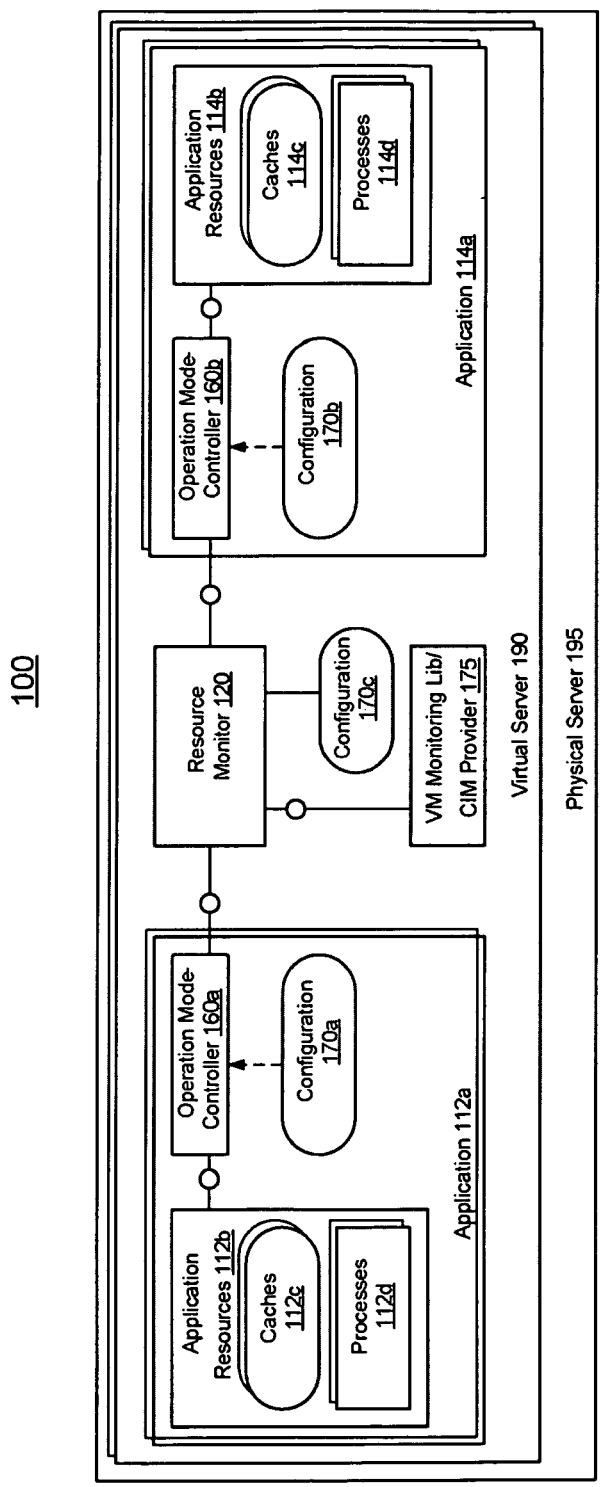
FIG. 1 depicts a block diagram of a system 100 including a virtual server, a resource monitor, and an operation mode controller.

Like labels are used to refer to same or similar items in the drawings.

DETAILED DESCRIPTION

FIG. 1 depicts a system 100 including a physical server 195. The physical server 195 may be implemented using one or more processors, such as computers, servers, processors, blades, and the like.

Physical server 195 includes a virtual server 190 implemented as a virtual machine, although any other virtualization technology, including a virtual appliance may be used as well. Virtual server 190 may include one or more applications, such as applications 112a and 114a, a resource monitor 120, configuration module 170c, and a virtual monitoring library and CIM provider (labeled "VM Monitoring Lib/CIM Provider) 175.

Applications 112a and 114a may be implemented as any application, program, application server, and the like. In some embodiments, applications 112a and 114a are implemented as enterprise services applications. For example, applications 112a and 114a may correspond to a customer relationship management (CRM) application, an enterprise resource planning (ERP) application, a product lifecycle management application, a supply chain management (SCM) application, a supplier relationship management application, and the like, although any other application may be used as well.

Applications 112a and 114a may include operation mode controllers 160a-b, configuration modules 170a-b, application resources 112b and 114b, caches 112c and 114c, and process 112d and 114d.

Operation mode controllers 160a-b may process event information received from resource monitor 120. Each operation mode controller 160a-b may locate resource monitor 120, register with resource monitor 120, and/or indicate that the operation mode controller is the so-called "active controller" for an application. For example, operation mode controller 160a may locate resource monitor 120, register with resource monitor 120, and/or indicate that the operation mode controller 160a is the active controller for application 112a, so that resource monitor 120 may send events to operation mode controller 160a. The operation mode controller 160a may be accessible through a standard interface, such as an Internet Protocol address, port number, or procedure call.

Moreover, in some implementations, the operations mode controller 160a may be configured specifically for the application. Operation mode controller 160a may be configured so that when an event is received, application 112a may be adapted to the change in resources at physical server 195. For example, if an event is received representing additional memory is available at physical server 195 (and as a result virtual server 190), operation mode controller 160a may increase its cache size. Moreover, that increase in cache size may be stored in configuration module 170a. If an event is received that additional processing capacity (e.g., quantity of central processing units) at physical server 195, operation mode controller 160a may increase the number of processes it may execute at any given time—that increase in processes stored in configuration module 170a. If an event is received that additional network bandwidth is available to a network (e.g., increase bandwidth to persistent storage or a database), operation mode controller 160a may increase the number of connections it may hold open at any given time—that increase in number of connections stored in configuration module 170a. If an event is received that additional storage capacity (e.g., disk space) is available at physical server 195, operation mode controller 160a may increase the number of files it may open at any given time—that increase in number of files stored in configuration module 170a. Although the previous examples provides examples related to memory, process, connection number, and number of files, operation mode controller 160a may adapt any aspect of application 112a to take advantage event messages from resource monitor 120. The event messages representing changes at physical server 195 as well as virtual server 190.

Configuration module 170a-b includes aspects of applications 112a and 114a that may be adapted (i.e., changed) based on event messages. For example, configuration module 170a-b may include a list of physical changes at physical server 195 and corresponding changes to an application's cache, processes, connection numbers, number of files, and the like.

Moreover, configuration module 170a-b may include operation mode configurations defining how to map resource constraints (e.g., that are reported by the resource monitor as events) to application resource configurations. The operation modes define how the internally used application resources have to be configured at a certain resource constraint. For example, the events reported by resource monitor 120 to an operation mode controller (e.g., operation mode controllers 160a-b) may provide information about changes in memory and CPU capacity. In some implementations, the operation mode controller may maintain two operation modes, such as a so-called "low footprint" and a so-called "high footprint". These two operation modes may define that at a certain CPU capacity range the internal application processes have to be of a given size (e.g., size X), likewise if the actual reported memory capacity is in a certain range the internal caches sizes have to be set to another size (e.g., size Y). In other words, the operation mode controller matches resource constraints reported as an event to the operation modes. If the requirements of a certain operation mode are met, the operation mode controller activates the associated configuration (e.g., affecting configuration of caches, pools, max number of process, etc.).

Application resources 112b and 114b may be any resources that an application, such as applications 112a and 114a, may use including caches 112c and 114c, processes 112d and 114d, number of connections (e.g., HTTP connections) to a network or an attached storage devise, and/or number of files used at any given time.

Caches 112c and 114c are the caches used by applications 112a and 114a, respectively. For example, application 112a may have a cache 112c used during the execution of the program code of application 112a. Varying the size of cache 112c may affect the performance of application 112a (e.g., more cache may result in shorter execution times).

Processes 112d and 114d are work processes, including threads, work processes, tasks, etc., used by applications 112a, 114a, respectively. For example, while application 112a is running, there may be one or more processes being executed. The total number of processes may be limited, which may also affect the overall performance of application 112a. For example, if application 112a searches a database for an airline reservation, limiting the number of processes 112d may limit the number of searches that can be performed at any given time—affecting the overall performance of application 112a.

Resource monitor 120 monitors resources at physical server 195 and virtual machine, e.g., virtual server 190. To monitor resources, resource monitor 120 may passively monitor messages associated with the operating system of physical server 195 or the virtual machine of virtual server 190. Alternatively, to monitor resources, resource monitor 120 may actively access the operating system of physical server 195 or the virtual machine of virtual server 190. For example, resource monitor 120 may receive information from another component of system 100, such as an operating system and/or a virtual machine, such as a hypervisor. Hypervisor refers to a program used to manage a virtual machine (also referred to as a virtual machine controller or, more simply, a controller). The hypervisor may control (or manage) the physical machine's processor, memory, storage, network capacity, and other resources enabling the virtual operating environment. VMWare ESX and VMware Server are examples of hypervisor software for virtualizing an operating environment, including IP (Internet Protocol) addresses, registries, and other aspects normally used at a computer of a network. Hypervisors are a so-called "layer of code" (and/or firmware) that enables resource sharing in a virtualization technology environment. Some hypervisors run directly on the system hardware to virtualize the virtual aspects of the physical system to provide virtual machines; while other hypervisors execute as a layer on top of the operating system of the physical machine.

Monitoring of resources may include monitoring one or more of the following: available central processor units at physical server 195; available physical memory at physical server 195; available physical storage at physical server 195; available cache at physical server 195; processor utilization at physical server 195; network bandwidth from at physical server 195 to a network; and/or number of available connection to another device, such as a database or network.

Moreover, the resource monitor 120 may be configurable. For example, a user interface may be used to access resource monitor 120 and configure which resources may be monitored. Moreover, resource monitor 120 may be configured to generate an event when one of the monitored resources reaches a trigger (e.g., a value). For example, when a central processing unit (CPU) is added to physical server 195, resource monitor 120 may generate a message to one or more operation mode controllers to notify them of the event. In some implementations, resource monitor 120 may store such configuration information in configuration module 170c. Configuration module 170c may also include resource sharing strategies for the different applications. Returning to the additional CPU example, resource monitor 120 may recognize the event by monitoring the operating system and access configuration module 170c. There, the configuration information may indicate that ⅔ of the resources should be provided to operation mode controller 160a. In this example, resource monitor 120 may send an event message to operation mode controller 160a indicating that ⅔ of a CPU is available, while operation mode controller 160b may receive an event message indicating that ⅓ of a CPU is available. Although the previous example describes the case of adding a CPU to physical server 195, any other change may be monitored by resource monitor 120 and reported as event messages to operation mode controllers 160a-b to enable those controllers to adapt (e.g., resize) the corresponding applications 112a and 114a.

In some implementations, resource monitor 120 may also include a standard interface, such as an Application Programming Interface callable by other components of system 100. Moreover, resource monitor 120 and configuration module 170c may be accessible via a user interface (e.g., browser, client software, etc.) to enable configuration of resource monitor 120 and configuration module 170c.

Configuration modules 170a-b provides local configuration information. For example, configuration module 170a includes configuration information local (i.e., specific to) application 112a. For example, the configuration modules 170a may include information, such as number or work processes, size of cache, number of connections, number of files used locally, and any other aspects of application 112a capable of being adjusted. Moreover, configuration module 170a may include trigger information (e.g., values representing under what circumstances these aspects may be adjusted). Table 1 below lists some aspects of application 112a and under what circumstances that aspect may be adjusted.

TABLE 1

| Aspect of Application 120a | Message Event | Adjustment |
|---|---|---|
| Number of work processes | Message indicating increase in CPUs at physical server | Increase number of work processes based on amount of increase |
| Size of cache | Message indicating increase in memory at physical server | Increase cache size based on amount of increase |
| Number of connections | Message indicating increase in bandwidth between physical server and network (and/or persistent storage) | Increase number of HTTP connections based on amount of increase |
| Number of files used locally | Message indicating increase in storage at physical server | Increase number of files stored locally at physical server based on amount of increase |

Figure 2:
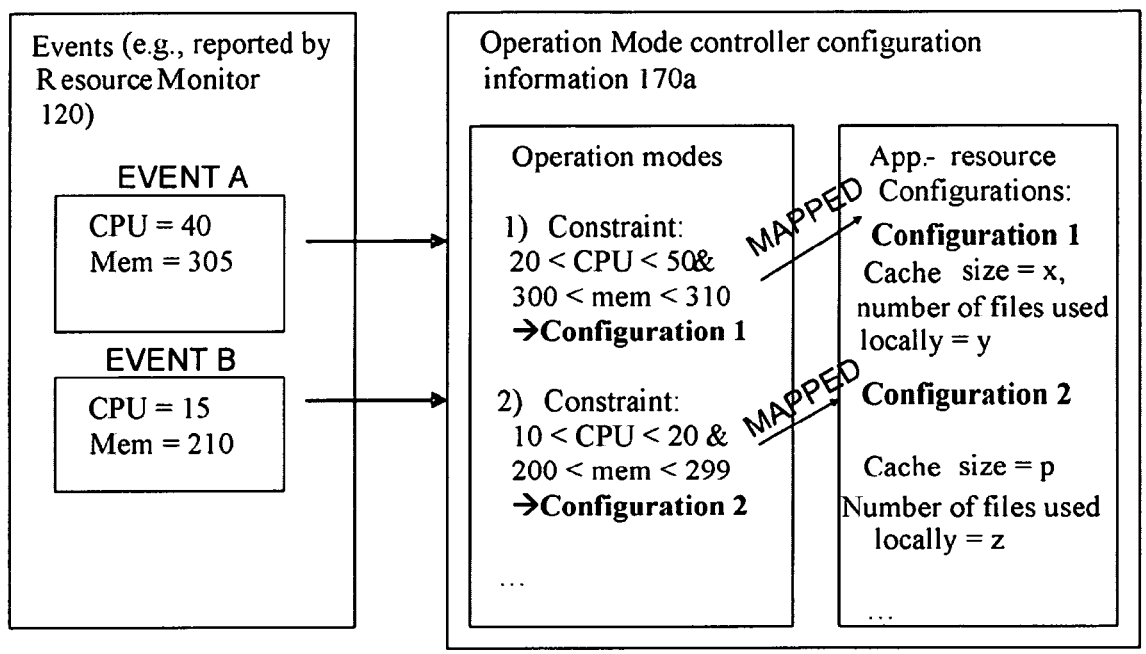
FIG. 2 depicts examples of configuration information.

FIG. 2 depicts an example of the type of information reported by resource monitor 120 and stored as configuration information at a configuration module, such as configuration modules 170a-b. Referring to FIG. 2, the configuration information may include operation modes, such as constraints. For example, the constraints of configuration 1 may define that the CPU can vary between 20 and 50 and the memory may vary between 300 and 310, while another configuration 2 may define that the CPU can vary between 10 and 20 and the memory may vary between 200 and 299. Moreover, the applications may be configured accordingly. For example, configuration 1 may be mapped to a cache size of x, a number of files used locally of y, while configuration 2 is mapped to another cache size p and number of files used locally z. In the example of FIG. 2, an event may report as an event that the CPU use is 40 and memory use is 305. When this is the case, configuration 1 is the operation mode and the resource configuration is a cache size x and number of files is y. This resource configuration can then be used by one of the applications, such as application 112a. When the event reports resources of CPU of 15 and memory of 210, operation mode of configuration 2 is used to resize the cache to p and the number of files used locally to z.

VM Monitoring Library and CIM provider 175 provides a mechanism of common information management. The VM Monitoring Library and CIM provider 175 decouples the resource monitor from the underlying operation system and virtual machine. The resource monitor calls methods at VM Monitoring Library and CIM provider 175 to access (e.g., retrieve, get, receive, and the like) the monitoring information. In some cases, VM Monitoring Library and CIM provider 175 notifies any registered applications with the observed situation at the operating system, virtual machine, and physical server. VM Monitoring Library and CIM provider 175 may also include a standard interface through which information regarding a specific type of application may be obtained. In some implementations, information for specific virtualization software may also be included in VM Monitoring/CIM provider 175. For example, for one or more applications, preconfigured information, such as the information in Table 1, may be stored for use by operation mode controllers 160a-b and configuration modules 170a-b.

Figure 3:
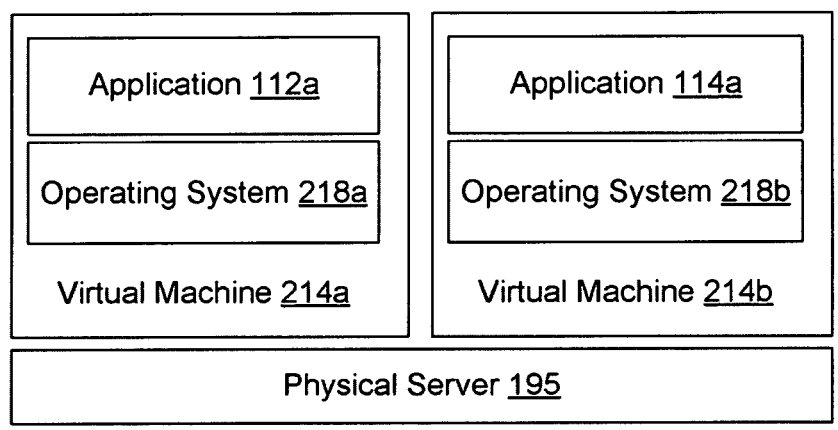
FIG. 3 depicts a block diagram of virtual machines.

FIG. 3 depicts an example implementation of virtualization technology. Referring to FIG. 3, physical server 195 may be implemented as one or more physical machines capable of hosting one or more virtual machines, such as virtual machines 214a-b. The virtual machines 214a-b may be implemented as software for creating a virtualized system between a physical machine and its operating system. In some implementations, the virtual machines 214a-b may be implemented as a virtual appliance, which refers to a virtual machine that includes an application, an operating system and, in some cases, data to configure and/or operate the application. Moreover, the virtual machines 214a-b may each include an application 112a, 114a, each of which runs within (e.g., as part of, in, on, etc.) the so-called wrapper provided by the virtual machine. In some implementations, each of the applications 112a, 114a may have an operating system 218a-b, such as Microsoft Windows, Microsoft Vista, Java, Sun OS, Linux, or any other operating system. Although FIG. 3 depicts a single physical server 195, two operating systems, and two virtual machines, any number (including zero) of physical servers, operating systems, and/or applications may be implemented as well.

Figure 4:
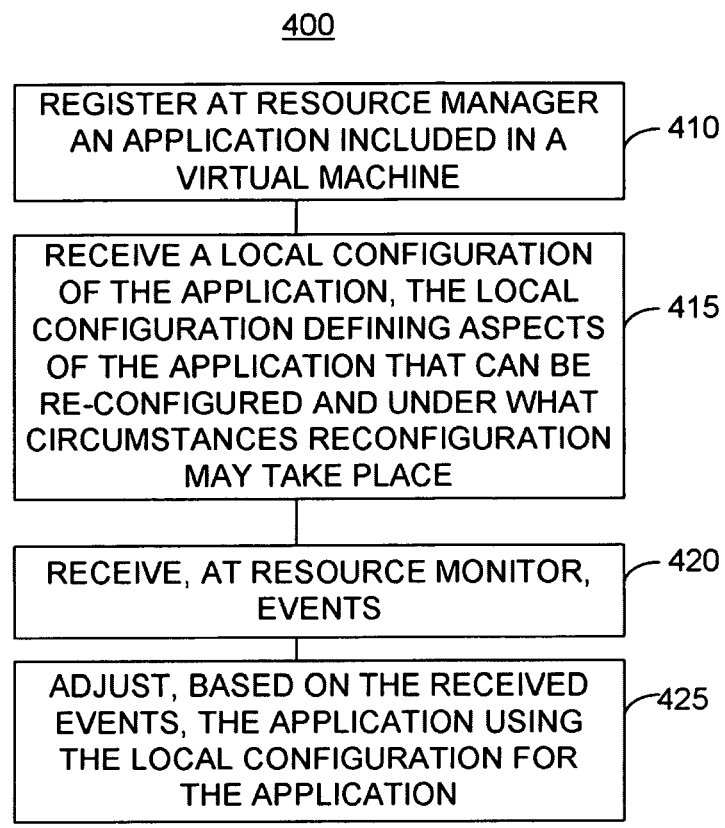
FIG. 4 depicts a process 400 for resizing an application at the virtual server using the resource monitor and the operation mode controller.

FIG. 4 depicts a process 400 for sizing an application to adapt to changes in physical resources.

At 410, an application, such as applications 112a and 114a, is registered at the resource manager 120. To register an application, an operation mode controller 160a may register the application by sending a message or accessing an interface at resource manager 120. For example, operation mode controller 160b may register application 114a by registering at resource manager 120 (e.g., subscribing to events at resource manager 120). At registration, the application informs the resource monitor that its corresponding operation mode controller controls the application. The application may indicate, during this registration, one or more of the following: the operation mode controller may specify that it only seeks information regarding CPU events since the defined operation modes in the application only react to CPU capacity changes; and an application name or identifier along with an application type information which may define what type of application it is (e.g., a memory intensive application), so that the configuration data at the resource monitor may refer to this type or name information to specify any sharing strategies. For example, the sharing strategy may define that the memory intensive application types have a priority of 1 and other applications have a priority of 2. The resource monitor reports resource constraint accordingly.

At 415, the operation mode controller receives local configuration information from configuration module 170a. The local configuration information defines what aspects of an application (e.g., application 120a) may be adapted, define under what circumstances the application may be adjusted, and/or define any thresholds under which an event (e.g., an event message) should be provided to an operation mode controller at an application. For example, the local configuration information stored at configuration information 170c may include information indicating that an event message should be sent to operation mode controller 160a when a CPU is added to physical server 195. At configuration information 170, there may be an indication to increase the number of work process to use the additional CPU. Although the previous example relates to adding a CPU, the configuration information 170a-c may include other aspects of the application that may be adapted based on changes at the physical server 195 (e.g., aspects listed in Table 1).

At 420, an operation mode controller, such as operation mode controller 160a, may receive an event message (e.g., information) representative of a change in resources, such as physical resources (e.g., CPU, memory, storage, network bandwidth, and the like). If a received event message triggers an adjustment, at 425, the operation mode controller 160a may adjust one or more aspects of application 112a to adapt to the change. The adaptation enables the application to adapt (e.g., change cache size and the like) to changes in the virtualization technology and/or the underlying physical resources (e.g., physical server 195).

Figure 5:
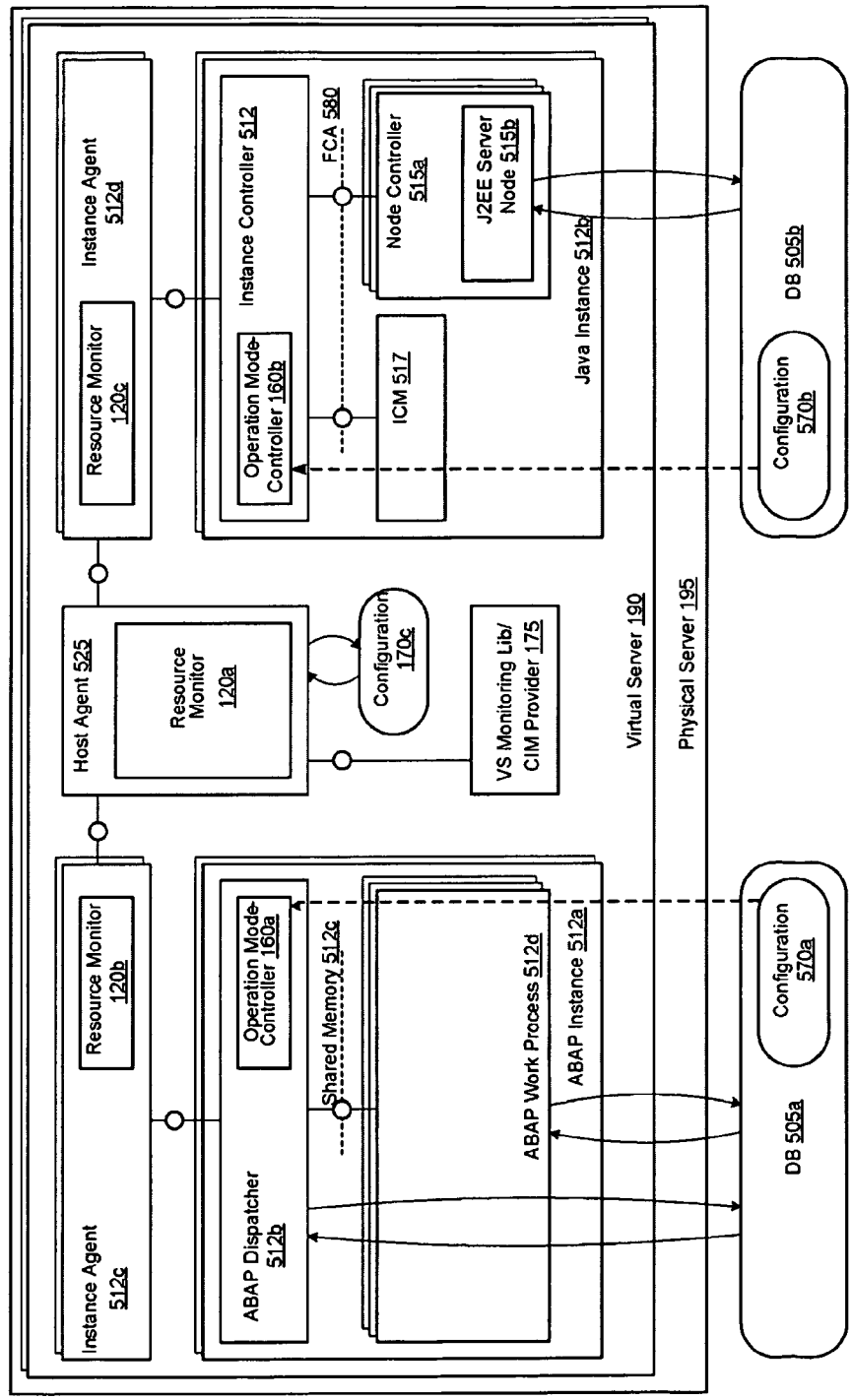
FIG. 5 depicts another block diagram of a system 500 including a virtual server, a resource monitor, and an operation mode controller.

FIG. 5 depicts a block diagram of a system 500 implemented in an environment including ABAP (Advanced Business Application Programming, available from SAP AG, Walldorf, Germany).

The system 500 includes a physical server 195 and a virtual server 190. Virtual server 190 includes two applications, i.e., an ABAP instance 512a and a Java instance 512b. Virtual server 190 also includes a host agent 525 including resource monitor 120a, configuration information 170c, and VM Monitoring Library and CIM provider 175. The host agent 525 represents an agent hosted on virtual server 190 to provide resource monitor 120a.

Resource monitor 120a provides event messages to operation mode controllers 160a-b through instance agents 512c-d, including an instance of the resource monitor 120bc. Operation mode controller 160a is included within ABAP dispatcher 512b, which serves to dispatch tasks to operation mode controller 160a. Operation mode controller 160a adapts ABAP instance 512a including shared memory 512c, work processes 512d, and the like. Configuration module 570a is included in persistent storage (labeled DB (database)) 505a.

Operation mode controller 160b is included within instance controller 512, which controls the instance including operation mode controller 160b. ICM (Internet Communication Manager) 517 controls messages within Java instance 512b including access to FCA 580 and configuration module 570b, which is included in persistent storage (labeled DB (database)) 505b. Operation mode controller 160b adapts Java instance 512b including memory, work processes, and the like. FCA (fast channel access) 580 is a networking protocol available from SAP AG, although other networking protocols may be used as well.

The subject matter described above relates to a mechanism for enabling virtualization systems and corresponding applications to adapt (e.g., resize) the configuration of applications, such as by changing resource constraints associated with an application to adapt to changes in physical resources available to the application. For example, the configuration of applications included within a virtual machine may include configuring the cache sizes of the application to adapt to the memory being offered (or available) by the physical machine or to the processes being run by the application given the capacity of the physical machine (e.g., the capability of the processor). The configuration mechanism described herein is particularly useful in system implementing virtualization technology, such as virtual machines and virtual appliances.

In some implementations, the dynamic reconfiguration mechanism described herein may be dynamically adapted to the resource conditions of the enclosed operating environment (e.g., physical server 195). This may, in some cases, allow efficient resource consumption and transparent performance control of the application. In some implementations, the configurations may be changed dynamically. Dynamically refers to changing the configuration while the applications are in use rather than a static configuration adapted to the physical machine (e.g., processor, computer, server, blade, and the like), such as a static configuration made during an installation.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Moreover, although the subject matter described above was described with respect to virtual machines, the virtual machines may be implemented as virtual appliances as well.

The foregoing description is intended to illustrate but not to limit the scope of the invention, which is defined by the scope of the appended claims. Other embodiments are within the scope of the following claims.

What is claimed is:

1. A computer-implemented method comprising:
    registering, at a monitor, one or more controllers associated with one or more corresponding applications;
    receiving configuration information for the one or more corresponding applications, the configuration information including a reconfigurable aspect of the one or more corresponding applications and an indication of circumstances for reconfiguration of the one or more corresponding applications;
    generating, at the monitor, event information indicating at least a first change in an amount of at least one physical resource, a second change in a quantity of central processing units, a third change in a quantity of cache, a fourth change in a quantity of connections, and a fifth change in a quantity of files capable of being stored locally at a physical machine; and
    providing the event information to the one or more controllers to cause the one or more controllers to adjust at least the reconfigurable aspect of the one or more corresponding applications, the change in the amount of the at least one physical resource mapped to a corresponding change in the reconfigurable aspect.

2. The computer-implemented method of claim 1 further comprising:
    implementing the monitor as a resource monitor.

3. The computer-implemented method of claim 2 further comprising:
    implementing at least one of the controllers as an operation mode controller coupled to the resource monitor.

4. The computer-implemented method of claim 1, wherein registering further comprises:
    registering, at the monitor, by providing a location of at least one of the controllers.

5. The computer-implemented method of claim 1 further comprising:
    receiving the event information as a message representative of an increase in the quantity of central processing units.

6. The computer-implemented method of claim 1 further comprising:
    receiving, at an operation mode controller, configuration information representative of an increase in a quantity of processes.

7. The computer-implemented method of claim 6 further comprising:
    adjusting, by the monitor, the quantity of processes at the one or more corresponding applications.

8. The computer-implemented method of claim 1, wherein providing further comprises:
    receiving changes to the resources of the physical machine.

9. The computer-implemented method of claim 1 further comprising:
    accessing a virtual machine to obtain change information representative of the resources of the physical machine.

10. The computer-implemented method of claim 3, wherein the operation mode controller activates a value in the reconfigurable aspect causing another change in one or more of a cache, pool, or maximum number of processes associated with the one or more corresponding applications.

11. A non-transitory computer-readable medium containing instructions to configure a processor to perform a method, the method comprising:
    registering, at a monitor, one or more controllers associated with one or more corresponding applications;
    receiving configuration information for the one or more corresponding applications, the configuration information including a reconfigurable aspect of the one or more corresponding applications and an indication of circumstances for reconfiguration of the one or more corresponding applications;
    generating, at the monitor, event information indicating at least a first change in an amount of at least one physical resource, a second change in a quantity of central processing units, a third change in a quantity of cache, a fourth change in a quantity of connections, and a fifth change in a quantity of files capable of being stored locally at a physical machine; and
    providing the event information to the one or more controllers to cause the one or more controllers to adjust at least the reconfigurable aspect of the one or more corresponding applications the change in the amount of the at least one physical resource mapped to a corresponding change in the reconfigurable aspect.

12. The computer-readable medium of claim 11 further comprising:
    implementing the monitor as a resource monitor.

13. The computer-readable medium of claim 12 further comprising:
    implementing at least one of the controllers as an operation mode controller coupled to the resource monitor.

14. The computer-readable medium of claim 11, wherein registering further comprises:

registering, at the monitor, by providing a location of at least one of the controllers.

15. A system comprising:
at least one processor; and
at least one memory, wherein the at least one processor and the at least one memory are configured to provide operations comprising:
  registering, at a monitor, one or more controllers associated with one or more corresponding applications;
  receiving configuration information for the one or more corresponding applications, the configuration information including a reconfigurable aspect of the one or more corresponding applications and an indication of circumstances for reconfiguration of the one or more corresponding applications;
generating, at the monitor, event information indicating at least a first change in an amount of at least one physical resource, a second change in a quantity of central processing units, a third change in a quantity of cache, a fourth change in a quantity of connections, and a fifth change in a quantity of files capable of being stored locally at a physical machine; and
providing the event information to the one or more controllers to cause the one or more controllers to adjust at least the reconfigurable aspect of the one or more corresponding applications, the change in the amount of the at least one physical resource mapped to a corresponding change in the reconfigurable aspect.

16. The system of claim 15 further comprising:
implementing the monitor as a resource monitor.

17. The system of claim 16 further comprising:
implementing at least one of the controllers as an operation mode controller coupled to the resource monitor.

18. The system of claim 15, wherein registering further comprises:
registering, at the monitor, by providing a location of at least one of the controllers.

19. The system of claim 15 further comprising:
receiving the event information as a message representative of an increase in the quantity of central processing units.

20. The system of claim 15 further comprising:
receiving, at an operation mode controller, configuration information representative of an increase in a quantity of processes.

21. The system of claim 20 further comprising:
adjusting, by the monitor, the quantity of processes at the one or more corresponding applications.

22. The system of claim 15, wherein providing further comprises:
receiving changes to the resources of the physical machine.

23. The system of claim 15 further comprising:
accessing a virtual machine to obtain change information representative of the resources of the physical machine.

24. The system of claim 17, wherein the operation mode controller activates a value in the reconfigurable aspect causing another change in one or more of a cache, pool, or maximum number of processes associated with the one or more corresponding applications.

* * * * *